Jan. 1, 1935.   R. C. SESSIONS   1,986,370
METHOD OF AND APPARATUS FOR ELECTRIC HEATING AND WELDING
Filed Oct. 24, 1932   3 Sheets-Sheet 1

INVENTOR:
ROBERT C. SESSIONS
BY Davis & Davis
ATTORNEYS

Jan. 1, 1935.   R. C. SESSIONS   1,986,370
METHOD OF AND APPARATUS FOR ELECTRIC HEATING AND WELDING
Filed Oct. 24, 1932   3 Sheets-Sheet 2

INVENTOR:
ROBERT C. SESSIONS
BY Davis & Davis
ATTORNEYS

Jan. 1, 1935. R. C. SESSIONS 1,986,370
METHOD OF AND APPARATUS FOR ELECTRIC HEATING AND WELDING
Filed Oct. 24, 1932 3 Sheets-Sheet 3

INVENTOR:
ROBERT C. SESSIONS
BY Davis & Davis
ATTORNEYS

Patented Jan. 1, 1935

1,986,370

UNITED STATES PATENT OFFICE 1,986,370

METHOD OF AND APPARATUS FOR ELECTRIC HEATING AND WELDING

Robert C. Sessions, Lakewood, Ohio

Application October 24, 1932, Serial No. 639,331

23 Claims. (Cl. 219—6)

My invention relates to electric heating or welding by the induction method. It is particularly applicable to the progressive electric heating or welding of metallic articles, such as tubular articles, cylinders or shells, and plates.

In progressively heating or welding such articles by the electric induction method, difficulty has been experienced due to the reduced heating effect near the ends of the articles. I am aware that several ways of overcoming this difficulty have been previously suggested. My invention may be used independently of, or in combination with one or more of, these ways to assist in heating or welding nearer to an end, or ends, of the articles.

Among the objects of my invention are:

Increasing the heat available for heating or welding as the starting end of the work is coming into and passing through the zone of influence of the magnetic field, and/or as the trailing end of the work is passing out of this zone, by decreasing the normal length of an air gap in the circuit of the magnetic field at the proper time whereby the heating or welding may be started nearer to the leading or starting end of the article to be heated or welded, and/or continued nearer to the trailing or finishing end of the article.

The provision of means for decreasing the air gap between a magnetic core on one side of the article to be heated or welded and a magnetic core on the other side of the article simultaneously with the passing of the article to be heated or welded out of a space or air gap between the poles.

The provision of a polar insert (air-gap insert) of magnetic material adapted to decrease the air gap between magnetic poles by being moved into the air gap as the article to be heated or welded moves out of the air gap.

The provision of means responsive to the movement or position of the work past, or relative to, a predetermined point to move a polar insert of magnetic material into place between the poles.

The provision of induction heating or welding apparatus employing a magnetic core having a pole, or poles, outside of a tube to be heated or welded, a magnetic core having a pole, or poles, inside the tube opposite the outside pole, or poles, with a magnetic, polar, air-gap insert, or inserts, adapted to be moved into the air gap, or air gaps, between the poles which are located at the end of the magnetic cores towards which the tube is moving, when the trailing end of the tube passes out of this air gap.

The provision of apparatus similar to that described in the paragraph above together with a magnetic, polar insert, or inserts, adapted to be moved into an air gap between the poles which are located at the end of the magnetic cores from which the tube moves, and adapted to be moved out of this air gap as the leading end of the tube enters this space or air gap between these poles.

The provision of means for moving the polar inserts into and out of spaces between the poles at the proper time.

The provision of means for supporting an internal magnetic core whereby it is held in definite position in respect to the poles of an external magnetic core, whether the work is entirely in the apparatus or not.

These and other objects which will be accomplished by the use of my invention, will be apparent from the specification, drawings and claims.

In the progressive electric induction heating or welding of tube, pipe or other metallic articles, the work being heated or welded is caused to be progressively traversed through a magnetic field so as to be progressively cut by (linked with) the magnetic field. It is customary to provide a magnetic circuit for the magnetic field, generally consisting of laminated magnetic members or cores on opposite sides of the work. In the case of tubing, a magnetic core, or a plurality of parallel magnetic cores, is located outside of the tube. This means that the magnetic circuit of the magnetic field must include one or more air gaps between the internal magnetic core and the external magnetic core at the point, or points, where the magnetic field passes between the internal core and the external core. The magnetic field is developed in the cores by the use of a suitable electric induction coil, or coils, energized from a suitable source of alternating current, or the equivalent. In principle, the induction coil, or coils, may be likened to the primary coil of a transformer, and the work itself may be considered the secondary of the transformer. Thus we have a transformer with an open magnetic circuit because of the air gap, or air gaps, in its magnetic circuit. The length of the air gap between the poles of the internal and external cores must be kept as small as possible in order to prevent excessively high magnetizing currents in the induction coil, or coils, and to reduce the leakage flux or leakage reactance.

When the work is passing through an air gap in the magnetic circuit, the metal of the work, if it is a magnetic substance, serves in itself to somewhat reduce the total length of the normal air gap or the distance between the poles of the external and internal magnetic cores. This is a condition that exists during the major portion of the time in which an article is being moved through the magnetic field and is being heated or welded. However, when one or the other of the ends of the work is entering or leaving the welding or heating zone (passing through the magnetic field), there are times when the metal of the work near an end is not located in the air gap, or one of the air gaps, between the internal and external magnetic cores and a shorter length of the work is surrounding the internal magnetic core. These and probably other conditions result in a decreased heating effect in the metal near the ends of the work (particularly the trailing end), and result in increased magnetizing current with a resulting poorer power factor. My invention overcomes, or helps to overcome, this difficulty by suitably decreasing or regulating the normal air gap, or space between the poles of the internal and external magnetic cores, when the work is not present between these poles. It will be obvious to those skilled in the art that the amount the normal air gap is reduced may be equivalent to the reduction afforded by the presence of the work in the air gap, or more or less than this reduction, depending upon the requirements of the particular work and the results which are to be effected. In general, it will be found that this reduction in the normal air gap should be such as to make the effective length of the air gap less than the effective length of the air gap when the work is present in the air gap.

Specifically, I provide magnetic material which may be moved into and out of the air gap, or air gaps, at the proper, predetermined times to accomplish this reduction of the air gap.

Although the theory of operation of my invention and the explanation thereof I believe to be correct, it should be understood that the use of my invention to obtain increased heating effects in the ends of articles being inductively heated or welded is not in any way affected by the soundness of the theories nor the accuracy of the explanation given. Accordingly, the invention is not to be limited to the operation under the theories and explanation included herein.

The drawings show my invention applied to the progressive electric induction welding of tubing or pipe. It will be readily understood that my invention may be applied to either heating or welding a great variety of articles.

The drawings are more or less diagrammatic and show the parts conventionally in order clearly to illustrate the principles and apparatus of my invention.

In the drawings I have shown a tube or pipe 1 being progressively traversed from left to right, as seen in Figs. 1, 2, 3 and 4. The tube is properly supported and moved by suitable sets of rolls 2, 3 and 4. Rolls 2 and 4 are shown as adapted to be power driven at the desired speed by any well known form of mechanism (not shown). It will be understood that the form, position and number of such supporting, feeding and pressure rolls may be greatly varied depending upon the type of work being heated or welded. Such means are well known in the art. For the sake of clearness, the rolls 3 are omitted from Figs. 2, 3 and 4.

I have shown my invention as applied to the welding of a longitudinal seam in tubing. The unwelded seam is indicated at 5 and the welded seam is indicated at 6.

An internal magnetic core 7 is shown with a longitudinally extending center section and poles 8 and 9 at the front and rear ends, respectively. I shall call the pole 8 the front or forward pole, and the pole 9 the rear or rearward pole. The poles 8 and 9 extend towards the inside surface of the tube.

The external part of the magnetic circuit is shown as consisting of parallel, longitudinally-extending magnetic cores 10, having forward poles 11 and rearward poles 12. It will be understood, of course, that the external magnetic core may be made in one part or any desired number of parallel parts. The poles 11 and 12 are preferably positioned in close proximity to the outside surface of the tube and are spaced from and opposite the poles 8 and 9, respectively, of the internal core. The poles 8 and 9 may be considered as being on one side of the work to be heated or welded and the poles 11 and 12 on the opposite side. The space between these poles is what I have called the normal air gap and must be sufficient to permit the work to pass through this air gap. Such poles, of course, need not be physical extensions of the cores. The surfaces from which the magnetic lines of force enter and leave the cores in the normal magnetic circuit are the actual poles, whether or not they are physical extensions of the cores.

An induction coil 13 is shown diagrammatically on a center section of the internal magnetic core 7. Suitable electric current, such as alternating current, or the equivalent, is conducted to the induction coil through connections 14—14 from a suitable source of current, not shown. The induction coil 13 may consist of a single series of turns, or it may consist of a plurality of series of turns connected in parallel. The turns of this coil are suitably insulated from each other and from the magnetic core and the work. The coil may consist of turns of flattened copper tubing as shown at 15, so that it may be readily cooled by passing cooling fluid through it. It will be understood that many forms of coils may be utilized and many ways provided for cooling the coils. It will also be understood that the induction coil means for developing the required magnetic field may be positioned as I have shown it on the internal magnetic core, or it may be positioned on the external core or cores, or it may be positioned to surround the outside of the tube, or otherwise suitably positioned, such as in two or more of these positions.

It is desirable that the magnetic cores be supported so that the air gap, or space between the poles, be maintained substantially constant during the welding or heating operation in order to insure uniform and non-fluctuating conditions in the magnetic circuit. The air gap should remain substantially constant at all times unless it is purposely desired to change it.

The internal magnetic core is shown as being mounted upon a longitudinally-extending bar or rod 16. This bar 16 may be divided into several parts, each comprising a portion of its longitudinal length, or otherwise suitably constructed, or it may be all in one piece as I have shown it. The bar 16 extends towards the entering end of the machine and may be secured to a suitable plate or supporting means (not shown) extending through the open seam 5 from the outside of the tube to the inside of the tube. This portion of the bar 16 may be termed an anchor bar in that it serves to partly support, or anchor, the internal magnetic core and other parts attached thereto, and also serves to maintain the desired relative longitudinal position of the internal poles 8 and 9 with respect to the external poles 11 and 12. Suitable rollers 17 and 18 are attached to the bar 16, or extensions of the bar 16, to engage the inner surface of the tube to further support and position the internal core. The internal magnetic core may be suitably insulated from its supporting members and from the tubing.

Figures 1, 2, 11, 19, 20:
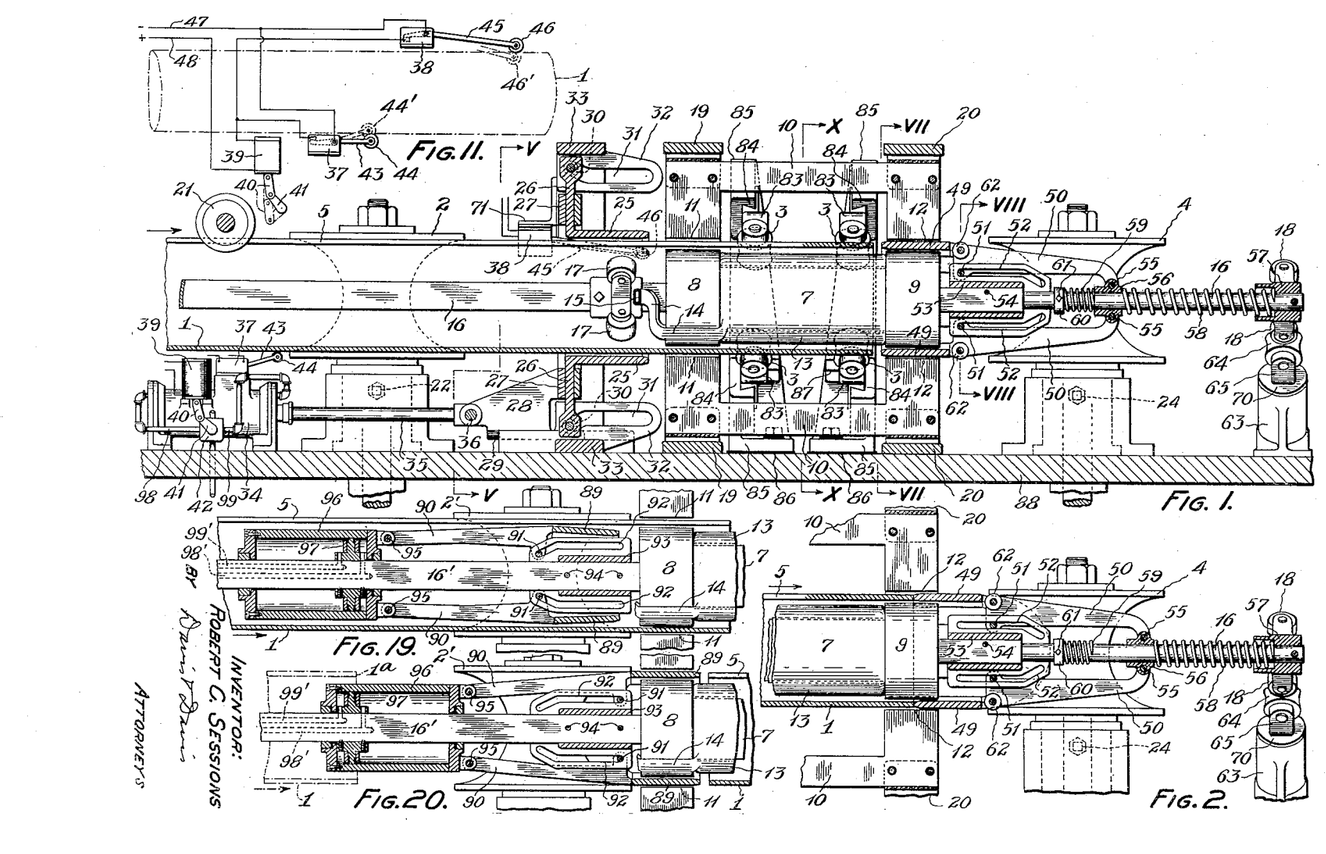
Fig. 1 is a side elevation partly in section. It shows the tube entering the induction unit, with the leading end of the tube about to pass through the air gap between the back, or rear poles.
Fig. 2 is a partial side elevation, partly in section, showing the rear poles. It shows the entering end of the tube as it is moving through the air gap between the rear poles.
Fig. 11 is a diagrammatic representation of the electric circuits between the limit switches and the solenoid controlling the operation of the air cylinder.
Fig. 19 is a partial side elevation, partly in sections, of a modified form of apparatus for actuating the polar inserts for the front poles. It shows the polar inserts withdrawn entirely from the air gap between the front poles.
Fig. 20 is a partial side elevation, partly in section, of the modified form of apparatus shown in Fig. 19. It shows the position of the parts when the polar inserts are in place in the air gap between the front poles.
Figure 10:
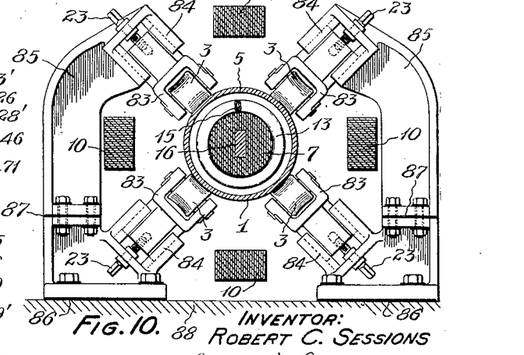
Fig. 10 is a vertical cross section taken in the plane indicated by the line X—X in Fig. 1.

I have shown the rolls 3 in Figs. 1 and 10 but have omitted them from the rest of the figures in order to avoid confusion. I have shown two sets or passes of such rolls 3, each set having four rolls. As shown in Fig. 10, the rolls 3 are adjustably mounted in sliding brackets 83. The brackets 83 are adapted to be adjusted in slideways 84 by the screws 23. The slideways 84 are a part of, or attached to, the standards 85, which are suitably insulated from the frame of the machine, as shown at 86, and are also made in two parts insulated from each other as shown at 87. All of these parts are preferably made of non-magnetic material.

I have provided members 25 of magnetic material shaped to conform to the air gap between pole 8 and the poles 11. These members 25, I prefer to call air-gap inserts, polar inserts, or polar, air-gap inserts. They are used for the purpose of decreasing the normal air gap between the poles 8 and 11 when the trailing end of the tube has moved out of the air gap between these poles and is passing on through the welding section of the machine.

These air-gap inserts 25, of which there are four in the particular apparatus shown in the drawings, are supported by mechanism adapted to move them into and out of the air gap at the proper time. The air-gap inserts 25 are provided with slides 26 which are either part of the members 25 or connected thereto. The slides 26 extend substantially at right angles to the members 25 and are adapted to move towards and away from the axis of the tube in the slideways 27. These slideways 27 extend radially towards the axis of the tube. The slideways 27 are a part of, or connected to, a sliding frame 28 which is formed with slides 29 whereby the frame 28 may be moved in a direction parallel to the movement of the work. Attached to the outer ends of each of slides 26 I have provided two rollers 30, one on each side of each slide. These rollers are adapted to move in the cam slots 31 in longitudinally extending portions 32 of a stationary frame 33. The stationary frame 33 is provided with longitudinally extending slideways in which the slides 29 of the frame 28 are adapted to slide. An air cylinder 34 is mounted on the bed 88 of the machine and has a piston rod 35 which is connected to the sliding frame 28 by a pin 36.

Figures 3, 12, 13, 14, 15, 16, 17:
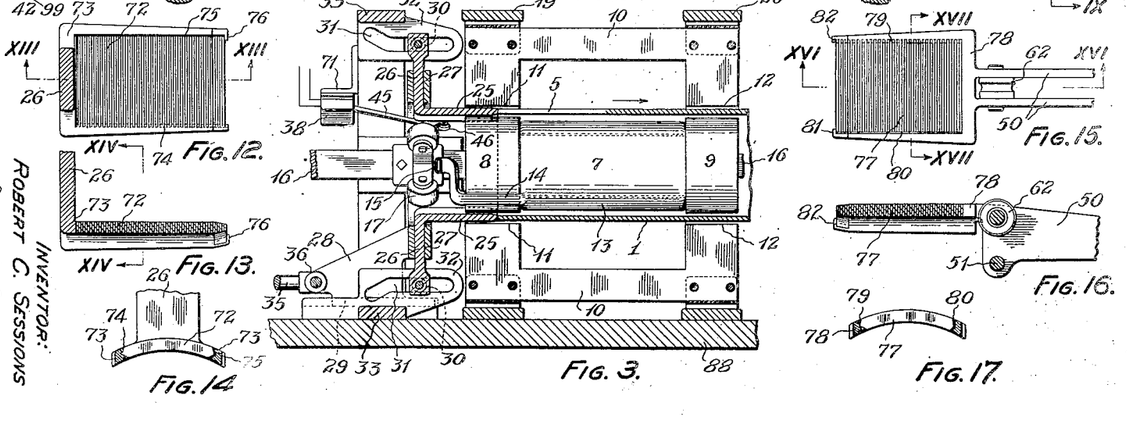
Fig. 3 is a partial side elevation, partly in section. It shows the trailing end of the tube passing through the air gap between the front poles with the polar inserts moving into place in the air gap between these poles as the trailing end of the tube moves out.
Fig. 12 is a plan view of one form of a laminated, polar insert, or air-gap insert, for the front poles.
Fig. 13 is a partial sectional view in a vertical longitudinal plane indicated by the line XIII—XIII in Fig. 12.
Fig. 14 is a vertical cross section on line XIV—XIV in Fig. 13.
Fig. 15 is a plan view of one form of a laminated polar insert for the rear poles.
Fig. 16 is a vertical longitudinal section taken in the plane indicated by the line XVI—XVI in Fig. 15.
Fig. 17 is a partial cross section taken in the plane indicated by the line XVII—XVII in Fig. 15.
Figure 4:
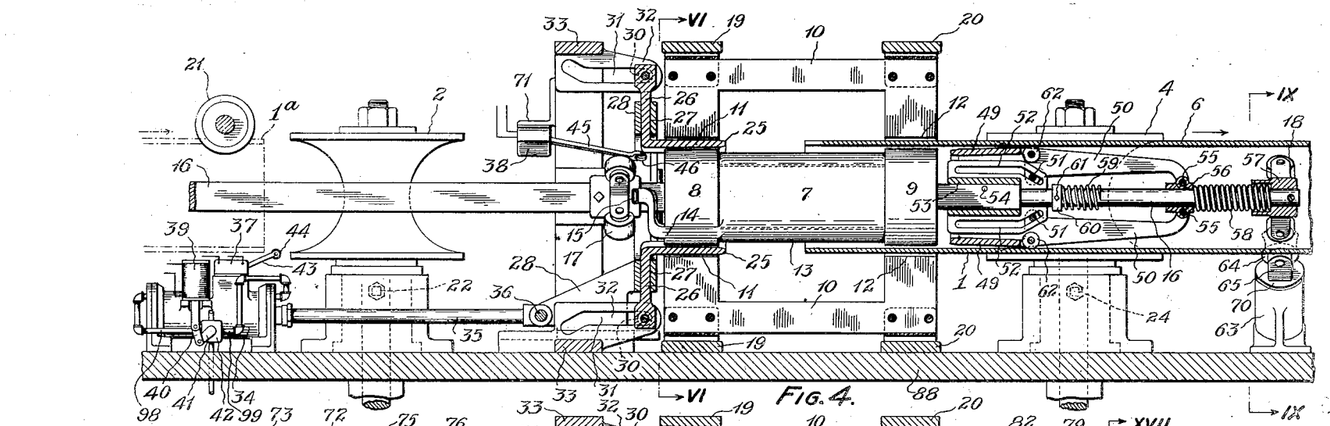
Fig. 4 is a side elevation, similar to Fig. 1. It shows the tube with the trailing end out of the air gap between the front poles but not yet past the rear poles. The polar inserts for the front poles are in place in the air gap.

Fig. 1 shows the polar, air-gap inserts 25 and the frame 28 at their extreme outermost position, the air cylinder 34 having moved the parts to the left as viewed in Fig. 1. When the piston rod 35 is moved to the right, that is, in the direction in which the tube moves, the frame 28 carries with it the slides 26 and the air-gap inserts 25, thus moving the rollers 30 in the cam slots 31 and causing the slides 26 to move first radially towards the axis of the tube and then to be held in a substantially fixed position radially. In this latter position the polar inserts 25 are so positioned that they pass freely into the air gap between the poles 8 and 11. Fig. 3 shows the polar inserts 25 starting to move between the poles. Fig. 4 shows the polar inserts 25 at their foremost position between the poles, with the sliding frame 28 and the piston rod 35 at the end of their forward travel. Thus it will be seen that the movement back and forth of the frame 28, relative to the stationary frame 33, causes the air-gap inserts 25 to move from the position shown in Fig. 1 to the position shown in Fig. 4 and back again to the position shown in Fig. 1. In the position shown in Fig. 1, these air-gap inserts 25 are held out, clear of the outside of the tube so that the tube is free to move past them.

The external magnetic cores 10 are shown as being supported by members 19 and 20. The external cores may be suitably insulated from their supporting members, as shown. The supporting members 19 and 20 are shown as being made of two halves insulated from each other in order to minimize the induced currents in them.

The tube is fed towards, through and out of the magnetic field by any suitable feeding means such as the sets of driven rolls 2 and 4. In welding a longitudinal seam in tubing a seam guiding or seam spreading roller or disc 21 may be employed. The open seam is usually held apart until it has passed the first or front poles 8 and 11. The seam edges are brought into contact with each other at the desired point by properly adjusting the space between the various sets of rolls by means of adjusting screws 22, 23 and 24. Heating or welding current is caused to flow in the metal of the tube and across the contacting seam edges as a result of electromotive force induced in the tube as it passes through the magnetic field. The final welding pressure or take-up is applied by the rolls 4, or by the combined action of the rolls 3 and 4. The adjustment of these rolls to give the required welding pressure is best determined experimentally. It is well known that there must be proper correlation between the pressure, speed and heat to effect a weld. The correlation which is used depends upon the type and character of weld being made.

This movement of the air-gap inserts 25 is preferably controlled by and responds to the movement and position of the tube or work passing through the welding machine. For this purpose I have provided two limit switches 37 and 38 in the electric circuit of a solenoid 39. The solenoid 39 is connected by a link 40 to a valve arm 41 of a valve 42. The valve 42 controls the flow of air, or other fluid, to the cylinder 34. A pipe 98 carries air to one end of the cylinder 34 and a pipe 99 carries the air to the other end of the cylinder 34.

Fig. 11 shows a diagram of the electrical circuits used in connection with this control apparatus. In Fig. 11 the outline of the tube or pipe is shown in dot and dash lines. The limit switch 37 is provided with an arm 43 on which is mounted a roller 44. The roller 44 normally lies in the broken line position 44'. The limit switch 38 is provided with an arm 45 having on its outer end a roller 46. The roller 46 normally lies in the broken line position 46'.

The limit switch 37 is shown supported on the cylinder 34, but it may be supported in any suitable manner. It must be positioned so that the tube strikes the roller 44 a sufficient time before the starting end of the tube reaches the polar inserts 25 so that the polar inserts 25 may be moved completely out of their position as shown in Fig. 4 into the position shown in Fig. 1.

Figure 5:
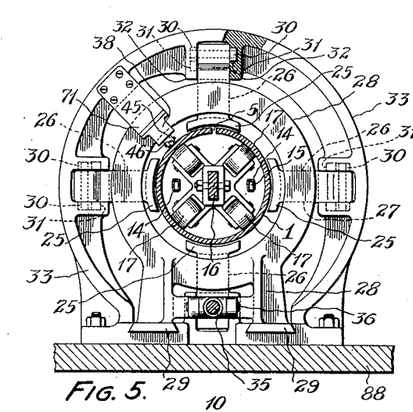
Fig. 5 is a vertical cross section taken in the plane indicated by the line V—V in Fig. 1.
Figure 6:
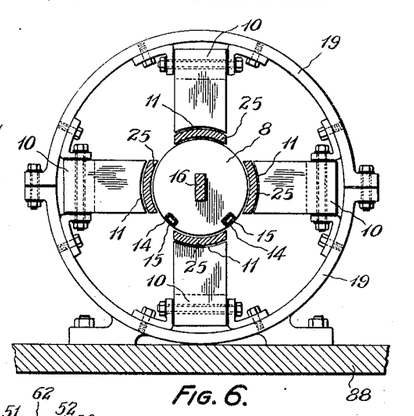
Fig. 6 is a vertical cross section taken in the plane indicated by the line VI—VI in Fig. 4.
Figure 7:
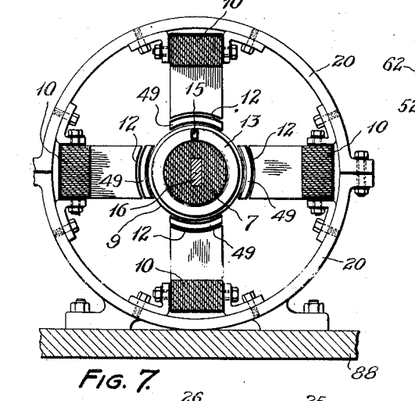
Fig. 7 is a vertical cross section taken in the plane indicated by the line VII—VII in Fig. 1.

The limit switch 38 is shown as being attached to a bracket 71 which is connected to the stationary frame 33, as shown in Figs. 1 and 5.

These two limit switches 37 and 38 are connected in parallel in one side of the circuit to the solenoid 39. The terminals 47 and 48 of the electric circuit are connected to a suitable source of electric current. Both limit switches are open when the rollers are in the dotted line positions 44' and 46', as shown in Fig. 11. At that time the solenoid 39 is not energized and the valve 42 is held in the position shown in Fig. 4 so that the air is admitted through the pipe 98 to the left hand end of the cylinder 34, and the piston rod 35, sliding frame 28 and the air-gap inserts 25 are positioned as shown in Fig. 4. The advancing, entering end 1a of a tube, shown in dot and dash lines at the left hand side in Fig. 4, strikes the roller 44 and closes the limit switch 37. This oncoming tube is moved up after the preceding tube has passed through the welding section of the machine. When the limit switch 37 is thus closed, the solenoid 39 is energized and the valve arm 41 is moved from the position shown in Fig. 4 to the position shown in Fig. 1 (as shown in the solid line position in Fig. 11). In this latter position air, or other fluid, is admitted to the right hand end of the cylinder 34 through the pipe 99, and the piston rod 35 is moved to the left, so that the air-gap inserts 25 are moved out from between the poles 8 and 11 to the position shown in Fig. 1, where they are out of the way of the advancing leading end of the oncoming unwelded tube. As the leading, or starting, end of the tube moves on towards the magnetic cores, it contacts with the roller 46 and closes the limit switch 38. This has no effect on the solenoid 39, as it has already been energized by the closing of the limit switch 37.

The tube then continues on through the machine until its trailing end passes over the roller 44. This opens the limit switch 37, but the solenoid 39 continues to be energized through the limit switch 38. When the trailing end of the tube passes the roller 46, the limit switch 38 is also opened and thus the circuit of the solenoid 39 is broken. This causes the solenoid then to throw the valve arm 41 to the position shown in Fig. 4, and also shown in the dot and dash lines in Fig. 11. This again admits air to the left hand end of the cylinder 34 and opens the right hand end of the cylinder 34 to the atmosphere. This causes the piston rod 35 to move to the right and in so moving it carries with it the sliding frame 28 and the air-gap inserts 25. The rate of this movement may be governed as desired, but I prefer to cause the parts to move considerably faster than the rate of movement of the tube so that the air-gap inserts 25 soon catch up with the trailing end of the tube, as shown in Fig. 3. The final rate of movement of the air-gap inserts 25 and the piston rod 35 is then restrained to be the same as the rate of movement of the tube, so that the air-gap inserts 25 move into the air gap as the tube passes out of the air gap. The end of their final movement is shown in Fig. 4. This final position may be limited by the length of the stroke of the piston rod 35 or by any suitable stops.

The arm 45 of the limit switch 38 is made the proper length so that the roller 46 moves radially inwardly off the trailing end of the tube at the proper time for starting the forward and radially inward movement of the air-gap inserts 25.

The tube then continues on through the machine and after the trailing end has passed beyond the poles 9 and 12 another tube may be moved up to the roller 44 of the limit switch 37 and the cycle repeated.

The air-gap inserts 25, together with their associated apparatus just described, thus function to regulate or decrease the length of the normal air gap between the poles 8 and 11 after the trailing end of the tube has passed out of this air gap. As explained, the air-gap inserts 25 are preferably moved into the space between the front poles 8 and 11 as the trailing end of the tube moves out of this space, so that their effect in decreasing the normal air gap may take place simultaneously with the passage of the trailing end of the tube out of this air gap.

I have also provided polar, air-gap inserts 49 of magnetic material shaped to conform to the air gap between the poles 9 and 12. These are adapted to move into and out of this air gap for the purpose of regulating or decreasing the normal air gap between the poles 9 and 12 when the starting or leading end of the tube or pipe is moving into the welding section and before it has reached these poles and entered the space between them. These air-gap inserts 49, of which there are four in the apparatus shown in the drawings, are part of, or connected to, the pairs of longitudinally-extending arms 50. These arms 50 are provided with pins or rollers 51 which are adapted to move in the cam slots 52. These cam slots 52 are located in the stationary bracket 53 which is fixedly secured by a pin 54 to the extension of the bar 16. Arms 50 are pivotally connected by pins 55 to a sliding sleeve 56. The sleeve 56 is adapted to slide on the bar 16. The end of the bar 16 is provided with a bracket 57 which is fixedly secured thereto. Between the sleeve 56 and the bracket 57, I have provided a spring 58 around the bar 16. On the other side of the sleeve 56 I provide a spring 59 which is held from moving to the left by a collar 60. The collar 60 is secured to the bar 16 by a set screw 61. The cam slots 52 extend from left to right parallel to the axis of the tube and then slant inwardly towards the axis of the tube.

Figures 8, 9:
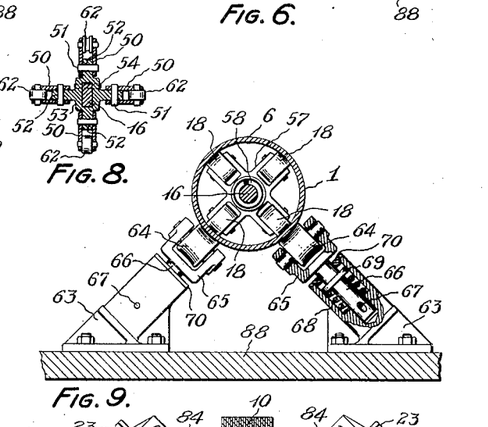
Fig. 8 is a vertical cross section taken in the plane indicated by the line VIII—VIII in Fig. 1.
Fig. 9 is a vertical cross section taken in the plane indicated by the line IX—IX in Fig. 4. One of the supports is shown partly in section.

Fig. 8 is a detail cross section on a line VIII—VIII of Fig. 1 and shows the general construction of the arms 50, pins or rollers 51, bracket 53, and other parts at this position.

The advancing, or starting, end of the tube approaches the air-gap inserts 49, as shown in Fig. 1. It contacts with the ends of the air-gap inserts 49 and starts pushing them out of the air gap between the poles 9 and 12, as shown in Fig. 2. The air-gap inserts 49 are held in a radially fixed position by the pins or rollers 51 in the cam slots 52 until the ends of the air-gap inserts 49 have passed entirely out of the air gap. The cam slots 52 then move the rollers or pins 51 radially inward. This causes the arms 50 and the air-gap inserts 49 to swing inwardly towards the axis of the tube about the pivot pins 55 to the position shown in Fig. 4. As the air-gap inserts 49 are pushed out of the air gap by the tube the sleeve 56 is moved along the bar 16 to compress the spring 58.

As the air-gap inserts, or polar inserts, 49 are moved inwardly, they pass out of contact with the starting end of the tube. This allows the tube to continue its forward travel with the air-gap inserts 49 and their associated mechanism entirely inside of the tube, as shown in Fig. 4. Each pair of arms 50 has mounted on them a roller 62. These rollers 62 contact with and roll against the inside surface of the tube, when the starting end of the tube has passed over the air-gap inserts 49. The rollers 62 serve to hold the arms 50 in their inward position as shown in Fig. 4, and prevent any return movement of the arms 50 and the air-gap inserts 49 until the trailing end of the tube has passed over them. When the trailing end of the tube passes over the rolls 62, the spring 58 presses against the sleeve 56 to move the arms 50 and the air-gap inserts 49 back into the position shown in Fig. 1. The cycle is then ready to be repeated. The spring 59 together with the collar 60 on the bar 16 acts as a cushion at the end of the return movement of the air-gap inserts to the position shown in Fig. 1. This position of the air-gap inserts shown in Fig. 1 is determined by the position of the left hand end of the cam slots 52.

Thus the air-gap inserts 49 are positioned between the poles 9 and 12 when the starting end of the tube is passing between the poles 8 and 11 and while it moves along towards the poles 9 and 12. This serves to decrease the normal air gap distance before the metal of the tube has entered this air gap between the poles 9 and 12. The air-gap inserts 49 are moved out of the space between the poles 9 and 12 as the entering end of the tube moves into this space, so that their effect is not entirely removed until the metal of the tube has completely entered the air gap and the inserts 49 have been moved entirely out of the air gap.

As shown generally in Figs. 1, 2 and 4, and in detail in Fig. 9, I provide rollers 18 mounted in the bracket 57 which is connected to the bar 16. These rollers 18 are adapted to engage the inside surface of the tube to assist in positioning and supporting the internal core 7 and the other parts which are supported by the bar 16. At this point I also provide two brackets 63 each of which supports one of the two rolls 64. These rolls 64 are mounted in brackets 65. Connected to, or as a part of, the brackets 65, I provide the extension 66 which is free to slide in the bracket 63 but is restrained from turning by the pins 67. The spring 68 is positioned between a shoulder on the bracket 63 and a shoulder 69 on the extension 66. This spring 68 is compressed so that it presses the roll 64 against the tube when a tube is present as shown in Fig. 9. When no tube is present it pushes the roll 64 against the roll 18. The movement of roll 64 towards the axis of the tube is limited by the contacting of the shoulder 69 with the cap 70. The amount of movement is determined by the space between the shoulder 69 and the cap 70 as shown in Fig. 9, and is such that the bar 16 is held in substantially the same horizontal plane when the tube is not present as it is held when the tube is present between the rolls 18 and 64. This is particularly important when the starting end of the tube is entering the machine and before it has reached the plane of the rolls 18. It will be readily understood that the number and position of the internal and external rolls may be greatly varied.

The start of the crosshatching in the seam of the tube in Figs. 1, 2, 3 and 4 is used to indicate approximately where the unwelded edges first contact with each other. This point may, of course, be varied as desired by adjustment of the rolls 2, 3 and 4 and/or the seam-spreading roller 21.

I prefer to call the total distance between the pole faces 8 and 11 or between the pole faces 9 and 12, the normal air gap, regardless of whether this distance be entirely through air or partially through air and partially through the metal of the work or the metal of an air-gap insert.

Figure 18:
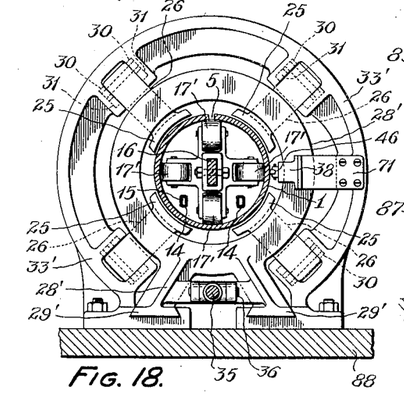
Fig. 18 is a vertical cross section of a slightly modified arrangement. It is a section similar to Fig. 5 but shows one possible modification wherein the air-gap inserts and the external magnetic poles have been moved 45° from their position in the previous figures.

A modified arrangement of the external cores and the polar inserts is shown in Fig. 18. It is similar to Fig. 5 except that it shows the position of the polar inserts 25 and internal rolls 17′ when the external cores and poles have been shifted 45° from their position as shown in the previous figures. Parts which are the same as the parts shown in the preceding figures are marked with the same reference numerals. A sliding frame 28', slides 29', and stationary frame 33', correspond in purpose and function to the parts 28, 29 and 33, respectively, of the previous figures. This is merely to suggest one of the many possible modifications.

If the internal rolls 18 at the rear end of this apparatus are positioned similarly to the rolls 17' shown in Fig. 18, a single external roll similar to one of the rolls 64 may be positioned below the internal roll which engages the bottom of the tube.

Figs. 19 and 20 show a modified arrangement for use if limitations of space at the front, or entering end, of the apparatus are such that the form of polar inserts and apparatus for supporting and moving them, which are shown in Fig. 1, cannot be used. The mechanism which controls the movements of these air-gap inserts may be positioned almost entirely within the path of movement of the tube and thus avoid interference with external parts. Such slight changes as will be necessary will be readily understood from Figs. 19 and 20. The changes will be chiefly in the form of mechanism for moving the inserts into and out of position between the poles. This can be readily done by the use of a movable air cylinder 96 surrounding a bar 16'. The bar 16' may be made to serve as a fixed piston rod with a fixed piston 97 on it to co-operate with the movable cylinder 96. Arms 90, similar to arms 50, may be pivotally connected at 95 to the movable cylinder 96. Polar, air-gap inserts 89 of magnetic material are similar to the inserts 49 or the inserts shown in Figs. 15, 16 and 17. They are adapted to conform to the air gap between the poles 8 and 11. These air-gap inserts 89, of which there are four in the apparatus shown in the drawings, are part of, or connected to, the pairs of longitudinally-extending arms 90. The arms 90 are provided with pins or rollers 91 which are adapted to move in the cam slots 92. These cam slots 92 are located in a stationary bracket 93 which is fixedly secured by pins 94 to the bar 16'. Arms 90 are pivotally connected by pins 95 to one end of the movable cylinder 96 which is adapted to slide on the bar 16'. The piston 97 is fixedly secured to the bar 16', so that the movable cylinder 96 may be caused to move back and forth along the bar 16' over the piston 97. Air, or other suitable fluid, for operating the cylinder 96 is supplied through holes 98' and 99' in the bar 16'. The holes 98' and 99' may be connected to the valve 42 (Fig. 1) by suitable pipes (not shown) which are connected to the pipes 98 and 99, respectively. The feed rolls 2' are similar to rolls 2, but have been moved up closer to the front poles 8 and 11.

The wiring diagram, solenoid, limit switches and associated parts which are used with the form of apparatus shown in Figs. 19 and 20 are the same as those shown in Fig. 11.

In the operation of the arrangement shown in Figs. 19 and 20, before a tube enters the machine the arms 43 and 45 of the limit switches 37 and 38, respectively, are in the position shown by the dot and dash lines in Fig. 11. The limit switches 37 and 38 are both open and the solenoid 39 is not energized. The valve 42 is in the position which admits air to the pipe 98, which in this form is connected to the hole 98' in the bar 16' (through connections which are not shown). This causes the cylinder 96 to be positioned as shown in Fig. 20 with the magnetic air-gap inserts 89 in place between the poles 8 and 11. When the tube is fed into the machine the advancing, entering end 1a strikes the roller 44 of the limit switch arm 43 to close the limit switch 37 and energize the solenoid 39, causing the valve 42 to assume a position such that air is admitted to the pipe 99 and through connections (not shown) to the hole 99' in the bar 16'. This causes the cylinder 96 to move to the left to the position shown in Fig. 19. Movement of the cylinder 96 thus moves the air-gap inserts 89 out of the space between the poles 8 and 11 into the position shown in Fig. 19. The movement of the air-gap inserts 89 is guided and controlled by the movement of the rollers 91 in the cam slots 92. The roller 44 which controls the limit switch 37 is positioned so that the polar inserts 89 are completely removed from the path of travel of the body of the tube before the entering end of the tube reaches them. If desired, the limit switch 37 may be manually actuated when a new tube is being started into the machine. As a tube continues its forward movement, the entering end 1a strikes the roller 46 of the limit switch arm 45 and closes the limit switch 38. This has no effect on the solenoid 39, and the parts remain in the positions shown in Fig. 19. When the trailing end of the tube passes over the roller 44 of the limit switch 37, the limit switch 37 is opened. This, likewise, does not affect the solenoid 39. When the trailing end of the tube passes over the roller 46 of the limit switch 38, this limit switch 38 is also opened and the circuit of the solenoid 39 is then broken. This causes the valve 42 to admit air to the pipe 98 and the hole 98' in the bar 16', moving the cylinder 96 to the right to the position shown in Fig. 20. As the cylinder 96 moves forward in the direction of movement of the tube, the polar inserts 89 are moved radially outward and forward, guided by the action of the pins or rollers 91 in the cam slots 92. The forward movement of the polar inserts 89 may be at any desired rate, but I prefer to move them faster than the rate of travel of the tube so that they soon catch up with and contact with the trailing end of the tube. They then continue forward into the air gap between the poles 8 and 11 at the same rate as the speed of travel of the tube. Thus the inserts 89 may be caused to enter the air gap substantially simultaneously with the movement of the trailing end of the tube out of this air gap. The tube continues on through and out of the machine, and the cycle is ready to be repeated with the next tube. The solenoid-controlled valve 42 for the air cylinder and the limit switches controlling the solenoid can all be located on the outside of the tube. The air supply may be readily brought to the cylinder through holes in the bar 16'.

The polar inserts 25 and 49 may be made of solid soft steel, or may be built up of suitable laminations. Figs. 12, 13 and 14 show one form for the air-gap inserts 25 in which they are built up of laminations 72 in order to minimize the eddy current losses. Figs. 15, 16 and 17 show one form of laminated air-gap inserts suitable for use as the inserts 49 or 89. It is obvious that the laminations might, if desired, be positioned so as to extend longitudinally, rather than circumferentially as shown in Figs. 12 to 17. Also, the circumferential extent and/or longitudinal extent of the polar inserts, whether solid or laminated, may readily be made considerably greater than shown, depending upon the results desired.

In the form shown in Figs. 12, 13 and 14, a suitable U-shaped frame 73 is provided for the laminations 72. The frame 73 may preferably be made of non-magnetic material. The laminations are clamped in place, suitably insulated from each other, and welded at one end to one side of the U-shaped frame as shown at 74. The other ends of the laminations fit into a notch or groove on the other side of the frame 73 and are insulated from the frame 73 with suitable insulation 75. The end of the grooved side of the U-shaped frame 73 is suitably bent over, as shown at 76, to hold the laminations in place at this side.

The construction as shown in Figs. 15, 16 and 17 is suitable for use as the inserts 49 or 89. Laminations 77 are mounted in a U-shaped frame 78. They are welded on one side as shown at 79 and are insulated from the other side of the U-shaped frame as shown at 80. The end of the side of the U-shaped frame which is insulated from the ends of the laminations, is bent over after assembly, as shown at 81, to hold the laminations in place. The other end of the U-shaped frame extends out as at 82 to be approximately in line with the bent-over portion 81. The advancing, entering end of the tube will strike and press against these ends 81 and 82. The U-shaped frame 78 is connected to, or made integral with, the arms 50.

The operation of my invention will be readily understood from the above description and the drawings.

While I have illustrated and described two possible forms of apparatus for carrying out my invention, it will be apparent to those skilled in the art that other forms may be used, and various modifications may be made without departing from the spirit and scope of my invention. For example, the limit switches 37 and 38 may be replaced by apparatus controlled by suitable photo-electric cells actuated by beams of light which may be directed so as to be intercepted by the moving work. The air-gap inserts 49 may also, obviously, be actuated by mechanism similar to that shown in Figs. 19 and 20 for actuating the air-gap inserts 89. Manually controlled means could obviously be used for starting the movement of the air-gap inserts.

I do not wish to be limited to the specific details of my method and apparatus shown and described herein, but claim as my invention all embodiments thereof coming within the scope of the appended claims.

I claim:

1. In electric induction heating of moving work in which the work is moved through an air gap between energized magnetic poles on opposite sides of the work, the method of increasing the heating effect in an end portion of the work which consists in inserting magnetic material into the air gap simultaneously with the movement of the work out of said air gap.

2. The method of heating a longitudinal seam in a tube which consists in inducing alternating electromotive force in successive sections of the tube by causing relative traversing movement of said tube and a magnetic field, and moving magnetic material into and out of the path of said magnetic field at predetermined times during the relative traversing movement to control the magnetic reluctance of a normal path of said magnetic field, whereby the amplitude of the induced electromotive force in a preselected portion of said tube may be maintained at predetermined values.

3. In an inductive heating system, including means for developing a magnetic field for inductively heating a moving article, a member of magnetic material outside of a main path of said magnetic field, and means for moving said member of magnetic material into a main path of said magnetic field when a preselected portion of said article is passing through said magnetic field.

4. In an inductive heating system, including induction coil means adapted to develop a magnetic field for inductively heating a moving article, a member of magnetic material normally disposed outside of a main path of said magnetic field, and means for moving said magnetic member into a main path of said magnetic field at a predetermined time.

5. In an inductive heating system, including induction coil means adapted to develop a magnetic field for progressively, inductively heating successive portions of a metal article, a member of magnetic material, and means controlled by said article for moving said magnetic member at a predetermined time into the normal path of the lines of force of said magnetic field when a predetermined portion of said article is in a predetermined relative position with respect to said induction coil means.

6. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, an air-gap insert, and means for moving said insert into an air gap between the front ends of said cores when the trailing end of said tubular article passes out of said air gap.

7. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said magnetic field whereby alternating electromotive force is progressively induced in said tubular article, an air-gap insert, and means for controlling the movement of said insert out of an air gap between the rear ends of said cores when the leading end of said tubular article passes into said air gap.

8. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, a polar insert of magnetic material, and means for causing said insert to move into and out of the space between said front poles at predetermined times.

9. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, a polar insert of magnetic material, and means controlled by the moving article for causing said insert to move into and out of the space between said front poles at predetermined times.

10. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, a polar insert of magnetic material, and means for controlling the movement of said insert into and out of the space between said rear poles at predetermined times.

11. In apparatus for the progressive electric induction heating of metal articles, a magnetic core on one side of the article to be heated, said core having front and rear poles spaced apart longitudinally in the direction of movement of said article, another magnetic core on the opposite side of said article, said other core having front and rear poles opposite and spaced from said front and rear poles of said first-named core, means for traversing said article longitudinally past said cores and through the space between said poles, a polar insert of magnetic material, means for causing said insert to move into and out of the space between said front poles at predetermined times, another polar insert of magnetic material and means for controlling the movement of said other polar insert into and out of the space between said rear poles at predetermined times.

12. In apparatus for progressive electric induction heating, a work support, a magnetic member having a pole terminating adjacent the work on said work support, means for supporting said magnetic member, another magnetic member spaced from said pole and disposed at the other side of the work, means for developing a magnetic field in said magnetic members, an air-gap insert of magnetic material, and means for moving said insert into the space between said pole and said other magnetic member when the work is not present therein.

13. In apparatus for inducing electric heating currents to flow in metal, induction coil means, means for causing alternating current to flow through said induction coil means to develop a magnetic field, means for causing progressive relative traversing movement between said field and the work to be heated, means for supporting said work whereby it is linked with said field, a member of magnetic material, means for moving said member into and out of the normal path of the magnetic lines of force of said magnetic field, and means responsive to the movement of said work past a predetermined point to actuate said means for moving said member.

14. In apparatus for progressively heating or welding a tubular article wherein the article is moved longitudinally through a heating zone, a longitudinally-extending member inside of the tubular article, internal roll means connected to said member and adapted to engage the inside surface of said tubular article, external roll means supported outside of said tubular article opposite said internal roll means, and means for moving said external roll means towards and into contact with said internal roll means when said tubular article is not present between them.

15. In combination with apparatus for the progressive heating or welding of tubular articles, a member extending longitudinally within the path of movement of the article, roll means fixedly supported with respect to said member, said roll means being adapted to engage the inside surface of said article, external roll means opposite said internal roll means, said internal roll means and said external roll means being separated from each other by the thickness of the article being moved between them, means for moving said external roll means towards and into contact with said internal roll means when the metal of the moving article is not present between them, and means limiting the amount of movement of said external roll means towards said internal roll means whereby said longitudinally-extending member is supported in substantially the same position when the metal of said article is not present between said internal and external roll means as it is when the metal of said article is present therebetween.

16. In apparatus for the electric induction welding or heating of tubing, means for supporting and moving the tubing, a magnetic core supported outside of said tubing, another magnetic core inside of said tubing opposite said first-named magnetic core, a longitudinally-extending, supporting member for said inside magnetic core, roll means fixedly supported with respect to said supporting member, said roll means being adapted to engage the inside surface of said tubing, external roll means opposite said internal roll means and spaced from said internal roll means by the thickness of the wall of said tubing when said tubing is passing between said internal and said external roll means, means for moving said external roll means towards and into contact with said internal roll means when said tubing is not present between them, and means limiting the extent of the movement of said external roll means to an amount such that said supporting member is supported in substantially the same position when said tubing is not present as it is when said tubing is present between said internal and said external roll means.

17. In apparatus for the progressive electric induction heating or welding of tubular articles, means for developing a magnetic field, magnetic cores opposite each other on opposite sides of said article, means for causing relative traversing movement of said cores and said article whereby said article moves through the space between said cores and is progressively linked with said magnetic field, magnetic material, means for moving said magnetic material into and out of the space between said cores, and means responsive to the movement of an end of said article past a predetermined point for actuating said last named means.

18. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, an air-gap insert, means for moving said insert into the air gap between the front ends of said cores when the trailing end of said tubular article passes out of said air gap, and means controlled by said tubular article for actuating said last named means.

19. In apparatus for the progressive electric induction heating or welding of tubular articles, a core within the path of the tubular article, a core outside the path of said tubular article, said cores extending generally longitudinally of said tubular article and having their front and rear ends spaced from each other by air gaps, means for developing a magnetic field in said cores, means for traversing said tubular article towards, through and out of said air gaps whereby alternating electromotive force is progressively induced in said tubular article, an air-gap insert, means for controlling the movement of said insert into and out of the air gap between the rear ends of said cores, and means controlled by said tubular article for actuating said last named means.

20. In apparatus of the class described, an electric coil, said coil being adapted to develop when energized a magnetic field, means for feeding a tubular article through said magnetic field, a member of magnetic material, and means controlled by said tubular article in its feeding movement through said magnetic field for moving said member of magnetic material into and out of the normal path of said magnetic field.

21. In apparatus of the class described, an electric coil, said coil being adapted to develop when energized a magnetic field, means for feeding a tubular article through said magnetic field, a member of magnetic material, and means responsive to the feeding movement of an end of said tubular article past a predetermined point for moving said member of magnetic material into and out of the normal path of said magnetic field.

22. In apparatus of the class described, an electric coil, said coil being adapted to develop when energized a magnetic field, means for feeding a tubular article through said magnetic field, a member of magnetic material, and means set in operation by the feeding movement of an end of said tubular article for moving said member of magnetic material into and out of the normal path of said magnetic field.

23. In apparatus of the class described, an electric coil, said coil being adapted to develop when energized a magnetic field, means for feeding a tubular article through said magnetic field, a member of magnetic material, means for moving said magnetic member into the path in space in said magnetic field which is normally traversed by the wall of said tubular article in its feeding movement, the movement of said magnetic member being in a direction substantially parallel to the direction of the feeding movement of said tubular article.

ROBERT C. SESSIONS.